(Model.)
G. LEUCHS & F. MEISER.
BOTTLE OR SIMILAR ARTICLE.
No. 411,157. Patented Sept. 17, 1889.
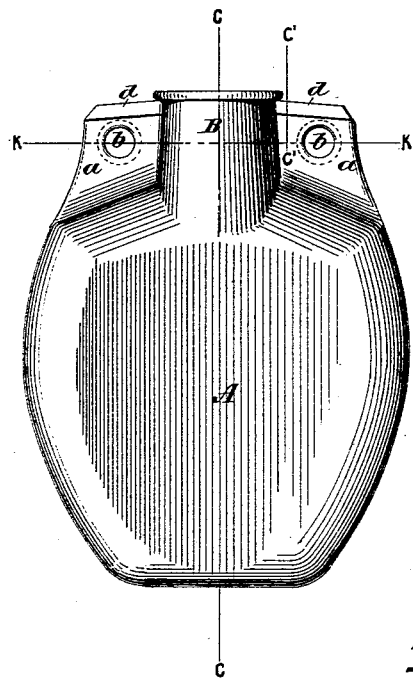
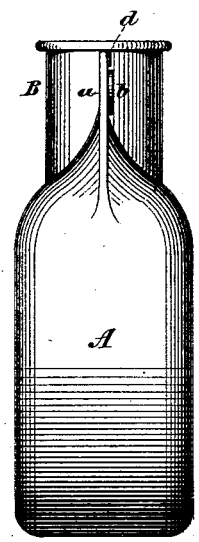
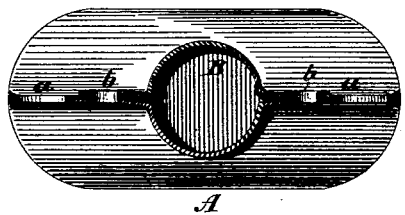
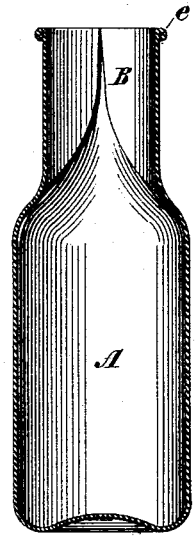
WITNESSES:
Gustave Dieterich
William Goebel
INVENTORS.
Georg Leuchs, and
Franz Meiser.
BY Briesen, Steele & Knauth
ATTORNEYS.

UNITED STATES PATENT OFFICE.

GEORG LEUCHS AND FRANZ MEISER, OF NUREMBERG, GERMANY.

BOTTLE OR SIMILAR ARTICLE.

SPECIFICATION forming part of Letters Patent No. 411,157, dated September 17, 1889.

Application filed November 13, 1888. Serial No. 290,759. (Model.)

*To all whom it may concern:*

Be it known that we, GEORG LEUCHS and FRANZ MEISER, of Nuremberg, Germany, have invented certain new and useful Improvements in Bottles and Similar Articles, of which the following is a specification, reference being had to the accompanying drawings, forming part hereof, in which—

Figure 1 is a side elevation of a bottle constructed according to our invention. Fig. 2 is a similar view at right angles to Fig. 1. Fig. 3 is a horizontal section on the line $k\ k$, Fig. 1. Fig. 4 is a vertical cross-section on the line $c\ c$, Fig. 1; and Fig. 5 is a detail section on the line $c'\ c'$, Fig. 1.

The object of our invention is to construct a seamless bottle, canteen, or the like of a single piece of metal without soldering or riveting the same.

The invention consist in the details of improvement that are more fully hereinafter set forth, and then pointed out in the claims.

In the accompanying drawings, the letter A represents a bottle or canteen constructed according to our invention.

B is the neck of the bottle or canteen, and $a$ are wings at the sides of the neck, as shown, the body of the bottle, the neck, and the wings all being in one piece of metal without any seams. The wings $a$ are shown provided with apertures $b$, by which the bottle may be supported. These apertures are made in the wings by stamping or the like, and the metal from one side of the wing is forced through the aperture and swaged over against the opposite side of the wing, as shown in Fig. 3, whereby a strong fastening is made. The metal of one side of each wing $a$, where the two sides come together to form the wing, is bent over the opposite side of the wing, as at $d$, whereby the upper sides of the wings are closed to prevent leakage. (See Fig. 5.)

The upper edge of the neck B of the bottle may be turned over and a wire or the like $e$ secured in this part of the neck, as in Fig. 2.

In constructing our improved bottle, we first take a disk of suitable metal of the desired size and stamp the same into the form of a cylinder, which may be done by the usual stamping process. After this we form a concave bottom, as in Fig. 4, to permit the bottle to stand on its end.

To make the neck B of the bottle, we pass a mandrel of steel or other suitable material and of the desired shape of the bottle-neck into the open end of the cylinder and fill the rest of the cylinder with a ductile substance—for instance, with putty. We then press the neck of the bottle between two matrices of the desired shape, whereby the metal of the cylinder is drawn down to form the bottle-neck and the two wings $a$ are formed by the pressure of the matrices—that is to say, the metal at the outer sides of the neck B is pressed flat, one side against the other, as shown in Figs. 3 and 4. The holes $b$ may next be made and the part $d$ of the wings turned over to finish the wings.

If a flat-shaped bottle or the like is desired—as, for instance, a canteen—we first fill the cylinder, made, as before stated, with a ductile substance and then press the same flat or to the desired shape between the two matrices. After this we form the canteen-bottom, as was done in making a cylindrical bottom. The ductile substance is next removed and a mandrel having the desired shape of the neck to be produced is passed into the end of the vessel and the metal pressed between two matrices to give the desired shape to the neck and to produce the wings $a$.

Any desired kind of stopper can be used for closing these vessels, and many vessels other than bottles can be made according to the above description—as, for instance, warming-pans, drinking-bottles, and the like.

Having now described our invention, what we claim is—

1. As a new article of manufacture, a seamless bottle made of a single piece of metal having a neck B and wings $a$ integral therewith, substantially as described.

2. As a new article of manufacture, the seamless bottle A, made of a single piece of metal and having the neck B and wings $a$ integral therewith, and apertures $b$ in said wings, substantially as described.

GG. LEUCHS.
FRANZ MEISER.

Witnesses:
ANDR. STICH,
M. HOCHSTÄDTER.